United States Patent [19]

Huang

[11] Patent Number: 4,848,908
[45] Date of Patent: Jul. 18, 1989

[54] OPTICAL HETERODYNE ROUGHNESS MEASUREMENT SYSTEM

[75] Inventor: Cheng-Chung Huang, Sunnyvale, Calif.

[73] Assignee: Lockheed Missiles & Space Company, Inc., Sunnyvale, Calif.

[21] Appl. No.: 544,506

[22] Filed: Oct. 24, 1983

[51] Int. Cl.[4] .......................... G01B 9/02; G01B 11/30
[52] U.S. Cl. .................................... 356/349; 356/360; 356/359
[58] Field of Search ................. 356/349, 351, 359, 360

[56] References Cited

U.S. PATENT DOCUMENTS

| | | | |
|---|---|---|---|
| 3,796,495 | 3/1974 | Laub | 356/349 |
| 4,340,304 | 7/1982 | Massie | 356/349 X |
| 4,353,650 | 10/1982 | Sommargren | 356/351 X |
| 4,498,770 | 2/1985 | Corwin et al. | 356/359 X |
| 4,534,649 | 8/1985 | Downs | 356/359 X |

FOREIGN PATENT DOCUMENTS 2109545  6/1983  United Kingdom ................. 356/359

OTHER PUBLICATIONS

Sommargren, "Optical Heterodyne Profilometry", AO, vol. 20, No. 4, pp. 610–618 (2-15-81).
Bennett et al., "Stylus Profiling Instrument for Measuring Statistical Properties of Smooth Optical Surfaces", AO, vol. 20, No. 10, pp. 1785–1802 (5-15-81).

Primary Examiner—Vincent P. McGraw
Attorney, Agent, or Firm—John J. Morrissey

[57] ABSTRACT

Two optical beams of different frequencies are focussed as concentric spots, one spot being larger than the other, on a reflective surface whose roughness is to be measured. The smaller spot has a maximum dimension that is smaller than any significant deviation of the profile of the surface from spatial uniformity, and the larger spot has a minimum dimension that is larger than any significant deviation of the surface profile from spatial uniformity. The two beams are reflected from the surface along a common path with a phase difference that is measured by a heterodyne interferometric technique. The phase difference measurement is indicative of the roughness of the surface, and is substantially insensitive to vibration of the surface.

4 Claims, 2 Drawing Sheets

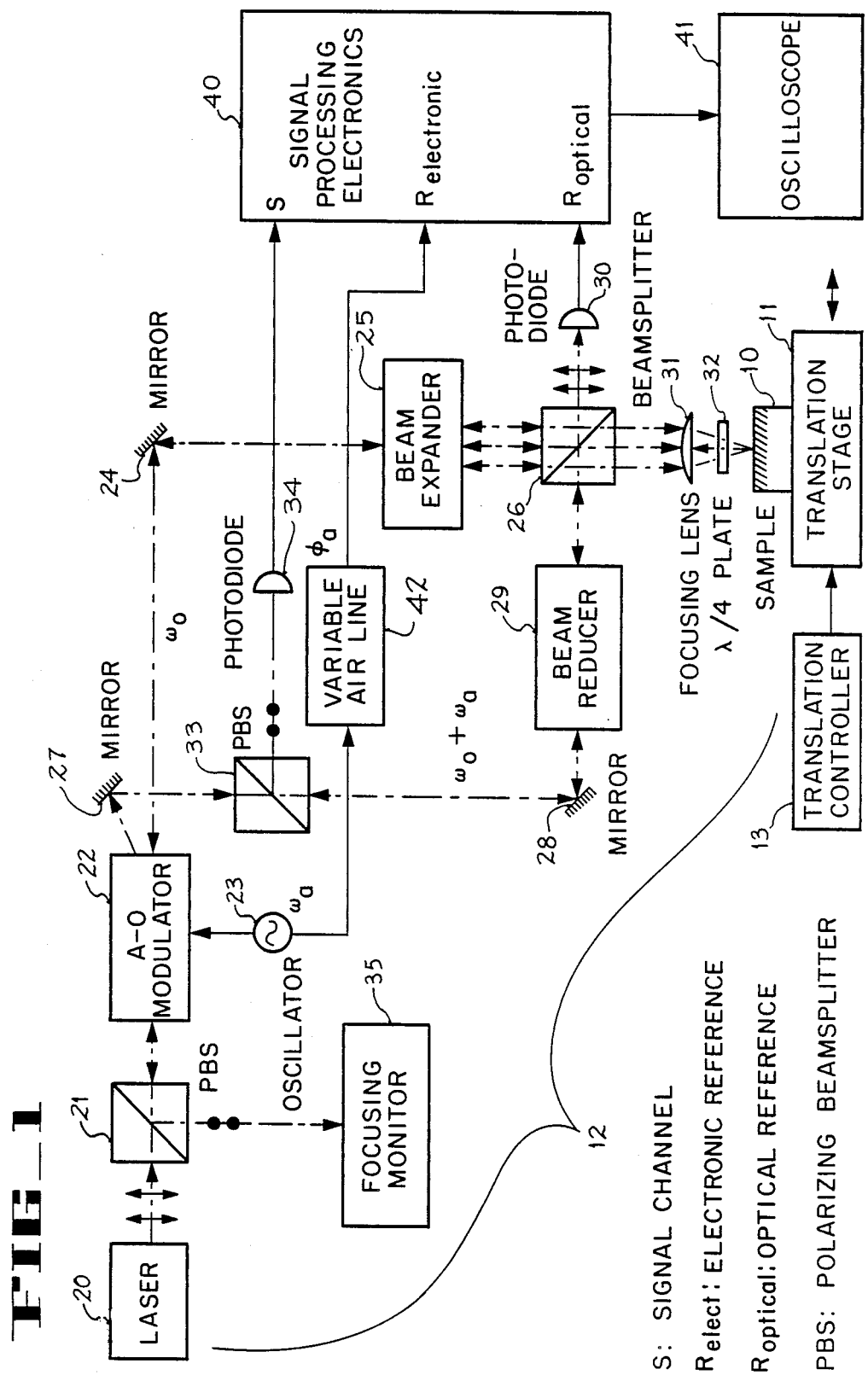
FIG_1

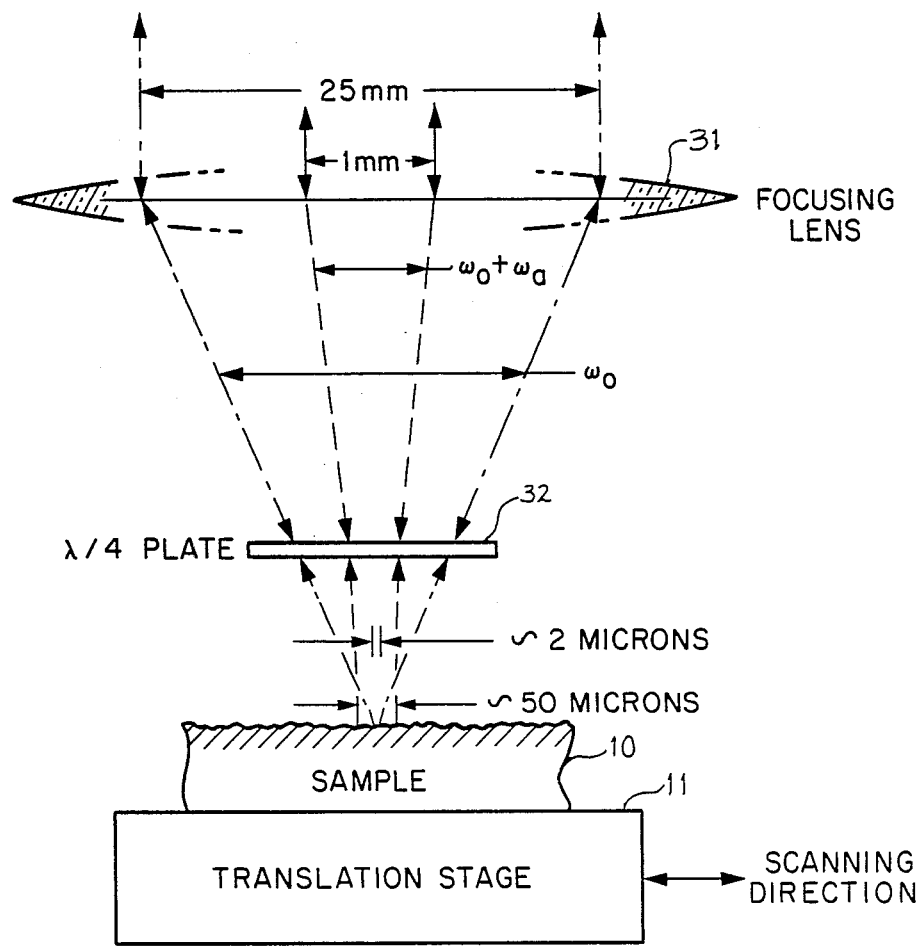
FIG_2

OPTICAL HETERODYNE ROUGHNESS MEASUREMENT SYSTEM

TECHNICAL FIELD

This invention relates generally to the measurement of roughness of optical surfaces, and pertains more particularly to heterodyne profilometry for measuring surface roughness.

DESCRIPTION OF THE PRIOR ART

The state of the art in measuring surface roughness of optical surfaces was discussed by J. M. Bennett and J. M. Dancy in an article entitled "Stylus Profiling Instrument for Measuring Statistical Properties of Smooth Optical Surfaces", *Applied Optics*, Vol. 20, No. 10, pp. 1785–1802 (May 15, 1981). Techniques involving mechanical contact between a stylus and the surface whose roughness is to be measured are ordinarily very sensitive to changes in surface roughness. However, a surface contact technique imposes extremely high local pressures on the surface under investigation, and thus tends to disturb or deform the surface.

A non-contact optical heterodyne technique for measuring the surface roughness of an optically reflective surface was described by G. E. Sommargren in an article entitled "Optical Heterodyne Profilometry", *Applied Optics*, Vol. 20, No. 4, pp. 610–618 (Feb. 15, 1981). According to Sommargren's technique, two orthogonally polarized optical beams of slightly different frequency are focussed as two separated focal spots on the surface whose roughness is to be measured. One focal spot serves as a reference, while the other focal spot scans the surface in a circular pattern. The two beams are reflected by the surface so as to interfere with each other. The intensity of the resulting interference pattern varies sinusoidally with the different optical phase of the two beams, which is proportional to the height difference between the two separated focal spots on the reflective surface. This height difference, and hence the differential optical phase, provides a measurement of surface roughness. A heterodyne interferometer is used to measure the differential optical phase, and hence to measure the surface roughness. However, vibrational motion of the reflective surface distorts the differential optical phase of the two reflected beams, and therefore renders the surface roughness measurement unreliable.

SUMMARY OF THE INVENTION

It is an object of the present invention to measure roughness of an optically reflective surface by means of an optical heterodyne interferometric technique that is substantially insensitive to optical phase jitter induced by vibrational motion of the reflective surface.

In accordance with the present invention, two laser beams of different frequencies are focussed as concentric spots (one spot being larger than the other) on a reflective surface whose roughness is to be measured. The smaller spot has a maximum dimension smaller than any significant deviation of the profile of the surface from spatial uniformity (i.e., absolute smoothness), and the larger spot has a minimum dimension larger than any significant deviation of the surface profile from spatial uniformity. The two beams are reflected from the surface, and the phase difference between the two reflected beams is measured by heterodyne interferometry. Because of the common path of the two reflected beams, the phase difference measurement is substantially insensitive to vibration of the reflective surface.

An optical heterodyne profilometer in accordance with the present invention can be made using conventional components that are commercially available at the present time, and is capable of resolving the optical phase difference (within an accuracy of 0.01 degrees i.e., a sensitivity range of 0.1 Angstrom) between two laser beams of different frequency reflected along a common path from a surface whose roughness is to be measured. Furthermore, an optical heterodyne profilometer according to the present invention made with commercially available components can enable rapid scanning (i.e., scanning at a rate in excess of 200 microns per second) of the reflective surface under a focussed spot size of less than 2 microns diameter for the smaller of the two concentric spots.

A preferred embodiment of the present invention is illustrated in the accompanying drawing and described hereinafter in the specification of the best mode presently contemplated for carrying out the invention.

DESCRIPTION OF THE DRAWING

FIG. 1 is a schematic representation of an optical heterodyne profilometer in accordance with the present invention.

FIG. 2 is a schematic view of the portion of FIG. 1 showing concentric first and second laser beams of different frequencies incident upon and reflected from the surface whose roughness is to be measured.

BEST MODE OF CARRYING OUT THE INVENTION

In the embodiment of the present invention as shown in FIG. 1, a sample 10 having a reflective surface whose roughness is to be measured is positioned on a translation stage 11, which is movable relative to a stationary optical heterodyne profilometer 12. A translation controller 13, which is operable either manually or by means of an electrical feed-back input from a focussing-monitor of the profilometer 12, controls the movement of the translation stage 11 and hence of the sample 10 relative to the profilometer 12. Alternatively, the sample 10 could be held stationary, and the profilometer 12 could be mounted for movement relative to the sample 10.

The profilometer 12 comprises a laser 20, which emits a monochromatic beam of visible electromagnetic radiation with an angular frequency $\omega_o$. The output from the laser 20 is polarized by a polarizing beam splitter 21, and the resulting polarized beam is input to an acousto-optical modulator (i.e., a Bragg cell) 22. As shown in FIG. 1, the direction of polarization of the beam generated by the laser 20 is on the plane of the paper, as indicated in the conventional manner by a pair of arrows perpendicular to the beam path.

An oscillator 23 drives the Bragg cell 22 with an angular offset frequency $\omega_a$, which causes the Bragg cell 22 to emit a first beam with the angular frequency $\omega_o$ and a second beam with a combined angular frequency $(\omega_o + \omega_a)$. In the preferred embodiment, the laser 20 is an HeNe laser with an output of 0.5 mW at a wavelength of 633 nm (i.e., an angular frequency of 475 THz). A typical offset angular frequency is 30 MHz. Typically, the first and second beams emitted by the Bragg cell 22 both have a diameter of about 1 mm.

The first beam with angular frequency $\omega_o$ is reflected from a mirror 24 through a beam expander 25 to a beam splitter 26. The second beam with angular frequency ($\omega_o + \omega_a$) is reflected from mirrors 27 and 28 in sequence through a beam reducer 29 to the beam splitter 26. The beam expander 25 comprises optical elements configured and arranged so as to expand the diameter of the first beam, typically to a diameter of about 25 mm. The beam reducer 29 comprises optical elements configured and arranged so as to reduce the diameter of the second beam, typically to a diameter less than 1 mm.

The beam splitter 26 reflects a portion of the expanded first beam and transmits a portion of the reduced second beam to a photodiode 30, which generates an electronic output signal $R_{optical}$ that serves as an optical reference. Careful alignment of the first and second beams by the beam splitter 26 so as to be collinear with each other enables the photodiode 30 to produce maximum photocurrent output at frequency $\omega_a$.

The beam splitter 26 likewise transmits another portion of the expanded first beam and reflects another portion of the reduced second beam to a focussing lens 31, which focusses these other portions of the first and second beams as first and second spots, respectively, on the surface of the sample 10. The focussing action of the lens 31 causes the first spot to be considerably smaller than the second spot, as illustrated in detail in FIG. 2.

The first spot produced by the focussing of the expanded first beam has a diameter that is smaller than any significant deviation from spatial uniformity that would be likely to be present on the surface of the sample 10. The second spot produced by the focussing of the reduced second beam has a diameter that is larger than any significant deviation from spatial uniformity (i.e., absolute smoothness) that would be likely to be present on the surface of the sample 10. Typically, the smaller first spot has a diameter on the order of 2 microns, and the larger second spot has a diameter on the order of 50 microns. The focussing lens 31 could be, e.g., a 50 mm, F/0.95 camera lens. Because the first and second beams are incident upon the surface of the sample 10 along a common optical path, the resulting first and second spots of illumination on the surface of the sample 10 are concentric.

A quarter-wave plate 32 is interposed between the focussing lens 31 and the reflective surface of the sample 10. The first and second beams are reflected by the surface of the sample 10 back along a common optical path through the quarter wave plate 32 and through the focussing lens 31 to the beam splitter 26. The double passing of each of the first and second beams through the quarter-wave plate 32 causes the direction of polarization of the beams returning to the beam splitter 26 after having been reflected from the surface of the sample 10 to be rotated 90° from the direction of polarization of the beams leaving the beam splitter 26 before passing through the quarter-wave plate 32 on the way to the surface of the sample 10.

As illustrated schematically in FIG. 2, the beam with angular frequency $\omega_o$, i.e., the expanded first beam, is reflected from the surface of the sample 10 through an inverted cone of radiation having a diameter of 25 mm at the focussing lens 31. The beam with angular frequency ($\omega_o + \omega_a$), i.e., the reduced second beam, is reflected from the surface of the sample 10 through an inverted cone of radiation having a diameter of 1 mm at the focussing lens 31. The two reflected beams concentrically overlap each other at the focusing lens 31, and are propagated along a common path back to the beam splitter 26.

A portion of each of the common-path first and second beams reflected from the surface of the sample 10 is reflected by the beam splitter 26 through the beam reducer 29 to the mirror 28, and thence to a polarizing beam splitter 33 interposed in the optical path between the mirrors 28 and 27. The polarizing beam splitter 33 reflects a portion of each of these reflected portions of the first and second beams to a photodiode 34 with a direction of polarization that is orthogonal to the direction of polarization of the beam from the laser 20, as indicated in the conventional manner in FIG. 1 by a a pair of dots on the optical path.

The photodiode 34 generates an electronic output signal S, which is proportional to the optical interference of the first and second beams reflected along their common path from the surface of the sample 10. The optical interference of the first and second beams reflected from the surface of the sample 10 to the photodiode 34 has a beat frequency $\omega_a$, which in combination with the phase difference between the interfering first and second beams provides a measure of the phase difference between the reflected first and second beams.

In the process of measuring the surface roughness of the sample 10 (i.e., in the "surface profiling" process), the sample 10 is translated relative to the common path of the first and second beams incident upon the reflective surface. The concentric first and second beams thereby scan the reflective surface so that the concentric first and second spots sweep over the reflective surface. The sample 10 could be, e.g., a mirror for use in a high-precision optical system. The surface of the mirror would initially be polished to a generally uniform degree of smoothness by a conventional polishing technique, and the optical heterodyne profilometer 12 of the present invention would be used to measure the degree of smoothness achieved by the polishing technique.

The diameter of the first spot formed on the surface of the sample 10 is too small to span completely any protuberance or indentation that amounts to a substantial change from spatial uniformity on the surface. Thus, the area of the first spot is too small to illuminate an entire protuberance or indentation of significant size on the surface. However, the area of the second spot formed on the surface of the sample 10 is large enough so that the distribution of protuberances and indentations (i.e., the number of deviations from spatial uniformity per unit area) illuminated by the second spot remains substantially constant as the concentric first and second spots are swept over the surface.

In being reflected from the surface of the sample 10, the first beam travels to the photodiode 34 through a distance that varies with the profile of the reflective surface as the concentric first and second beams scan the reflective surface. Since the first beam illuminates the reflective surface with the first spot, which is smaller than any protuberance or indentation of significant size on the reflective surface, the distance travelled by a wavefront of the first beam in being reflected from the surface to the photodiode 34 is longer when the first spot is formed on a depression or indentation on the surface, and shorter when the first spot is formed on a bulge or protuberance on the surface. On the other hand, since the second beam illuminates the reflective surface with the second spot, which is larger than any individual protuberances or indentations on the surface, the average distance travelled by all portions of a wavefront of the second beam in being reflected from the reflective surface to the photodiode 34 is substantially constant as the first and second beams scan the reflective surface. Therefore, variations in the phase difference between wavefronts of the first and second beams reaching the photodiode 34 correspond to variations in the height or profile of the reflective surface.

The phase difference measurement indicated by the output signal S of the photodiode 34 is the difference between the phases of the concentric first and the second beams reflected along their common path from the surface of the sample 10. The reflected first beam provides an optical phase that is precisely sensitive to deviations from spatial uniformity (i.e., precisely sensitive to roughness) occurring on the surface of the sample 10. The reflected second beam provides a reference phase with which the phase of the reflected first beam is continuously compared. The two beams reflected from the surface of the sample 10 have different frequencies and phases, and therefore interfere with each other with a beat frequency that carries the differential phase. This differential phase, which is measured by the optical heterodyne profilometer 12, provides a measure of the roughness of the reflective surface of the sample 10.

Referring to FIG. 1, another portion of each of the first and second beams is reflected from the surface of the sample 10 via the beam splitter 26, the beam expander 25, the mirror 24 and the Bragg cell 22 to the polarizing beam splitter 21. A portion of each of these reflected common-path first and second beam portions is reflected by the polarizing beam splitter 21 to a focussing monitor 35, which indicates the quality of the focussing of the first and second beams upon the reflective surface of the sample 10. The best focussing occurs when the intensity of the beams received on the focussing monitor 35 is maximum.

In a particular application, the intensity of the beams received on the focussing monitor 35 could be measured visually. Any adjustment of the position of the translation stage 11 that might be necessary to obtain optimum focussing could be accomplished manually. Alternatively, however, the focussing monitor 35 could comprise a photodetector for generating an output signal proportional to the combined intensities of the first and second beams incident upon the reflective surface of the sample 10, and the translation controller 13 could be driven by that output signal so as to move the sample 10 to the position of optimum focal quality.

The oscillator 23 also provides an electronic output signal $R_{electronic}$ that serves as an electronic reference. The signals $R_{optical}$, S and $R_{electronic}$ are input to a signal processor 40, which computes the differential phase between the two common-path first and second beams reflected from the surface of the sample 10. The differential phase measurement is linearly proportional to the degree of surface roughness of the sample 10. Since any vibration of the sample 10 would impart substantially the same optical phase change to each of the first and second beams, the differential optical phase computed by the signal processor 40 is substantially unaffected by vibration of the sample 10.

The output of the signal processor 40 can be displayed on an oscilloscope 41. A Tektronix 7854 programmable oscilloscope has been found suitable for displaying a root-mean-square (rms) reading, and a Tektronix 7834 storage oscilloscope has been found suitable for phase variation comparisons.

For a theoretical understanding of the mode of operation of the optical heterodyne profilometer 12, consider the electric fields $E_1$ and $E_2$ of the first and second beams, respectively, reflected from the surface of the sample 10. These two electric fields can be expressed as waveforms.

$$E_1 = \sqrt{2}\, F \cos\{\omega_o t + \phi_o(t) + \phi_s(t)\} \qquad (1)$$

$$E_2 = \sqrt{2}\, G \sin\{\omega_o t + \omega_a t + \phi_o(t) + \overline{\phi_s(t)} + \phi_a(t)\} \qquad (2)$$

where $\sqrt{2}\,F$ and $\sqrt{2}\,G$ are the amplitudes of the respective waveforms, $\phi_o(t)$ is the common optical phase due to vibration of the sample 10, $\overline{\phi_s(t)}$ is the optical phase due to surface roughness of the sample 10, $\phi_s(t)$ is the optical phase due to surface roughness averaged over the larger second focussed spot, and $\phi_a$ is the electronic phase associated with the offset frequency $\omega$hd a.

For a conventional "square-law" photodiode receiving light from two different beams the integrity of the photodiode output is proportional to the square of the electric fields of the two beams, i.e., $I = E_1 \cdot E_2$. Multiplying equations (1) and (2) yields $$I = FG \sin\{\omega_a t + \overline{\phi_s(t)} - \phi_s(t) + \phi_a\} + FG \sin\{2\omega_o t + \omega_a t + 2\phi_o(t) + \overline{\phi_s(t)} + \phi_s(t) + \phi_a\}. \qquad (3)$$

Defining $AC = FG \sin\{\omega_a t + \phi_s(t) - \overline{\phi_s(t)} + \phi_a\}$, and $DC = FG$, (since the photodiode responds to the amplitude and not to twice the optical frequency), equation (3) becomes $$I = AC + DC, \qquad (4)$$

where AC represents the alternating current response of the photodiode, and DC represents the direct current response of the photodiode. the ratio AC/DC is $$AC/DC = \sin\{\omega_a t + \overline{\phi_s(t)} - \phi_s(t) + \phi_a\}. \qquad (5)$$

In equation (5), the common optical phase $\phi_o(t)$ due to vibration of the sample 10 has been eliminated. Thus, the surface roughness represented by $\overline{\phi_s(t)} - \phi_s(t)$ can be measured despite any vibration that the reflective surface of the sample 10 may be undergoing. Also, the amplitude terms F and G have been eliminated in equation (5). Thus, the resultant phase measurement is insensitive to any variations in signal intensity that might occur. This technique for eliminating dependence upon signal intensity is known as the electronic common-mode rejection technique.

In equation (5), the calibration of optical phase $\overline{\phi_s(t)} - \phi_s(t)$ can be simulated by using the electronic phase $\phi_a$. Since the electronic phase $\phi_a$ changes by $2\pi$ when the propagation length changes by 10 meters in free space for a 30 MHz electromagnetic wave, an electronic phase change of 0.01° can be achieved by introducing a change of 0.3 mm in the length of a variable air line 42 interposed between the oscillator 23 and the signal processor 40.

A particular embodiment has been described herein for an optical heterodyne profilometer in accordance with the present invention. However, other embodiments suitable for particular applications would become apparent to workers skilled in the art upon perusal of the foregoing specification and accompanying drawing. The description presented herein is illustrative of the invention, which is more generally defined by the following claims and their equivalents.

I claim:

1. A method for measuring roughness of a reflective surface, said method comprising the steps of:

(a) irradiating said surface with first and second beams of coherent electromagnetic radiation, said first beam having a different frequency from said second beam, said first and second beams forming corresponding first and second focussed spots on said surface, one of said spots overlapping the other of said spots, said first spot having a maximum dimension smaller than any significant deviation of said surface from spatial uniformity, said second spot having a minimum dimension larger than any significant deviation of said surface from spatial uniformity; and (b) measuring differential phase of said first and second beams reflected from said surface by optical heterodyning of said first and second beams, said differential phase being indicative of roughness of said surface.

2. The method of claim 1 wherein said first and second beams form concentric first and second spots on said surface.

3. An apparatus for measuring roughness of a reflective surface, said apparatus comprising:

(a) means for irradiating said surface with first and second beams of coherent electromagnetic radiation, said first beam having a different frequency from said second beam, said first and second beams forming corresponding first and second focussed spots on said surface, one of said spots overlapping the other of said spots, said first spot having a maximum dimension smaller than any significant deviation of said surface from spatial uniformity, said second spot having a minimum dimension larger than any significant deviation of said surface from spatial uniformity, said first and second beams being reflected from said surface so as to interfere with each other; and (b) optical heterodyne means for measuring differential phase of said first and second beams reflected from said surface, said differential phase being indicative of roughness of said surface.

4. The apparatus of claim 3 wherein said means for irradiating said reflective surface comprises a laser producing a substantially monochromatic output, and an acousto-optical modulator having first and second output channel, said acousto-optical modulator transmitting said monochromatic output of said laser via said first output channel as a first output signal, said acousto-optical modulator generating a second output signal having a frequency different from said first output signal, said second output signal being transmitted by said second output channel.

* * * * *